United States Patent [19]
Becker et al.

[11] 3,937,529
[45] Feb. 10, 1976

[54] LOW GROUND PRESSURE TRACK SHOE

[75] Inventors: Danny J. Becker, Peoria; Roger L. Boggs, East Peoria; Kenneth E. Vaughn, Creve Coeur; James Richard Shuler, Eureka, all of Ill.

[73] Assignee: Caterpillar Tractor Co., Peoria, Ill.

[22] Filed: Oct. 24, 1974

[21] Appl. No.: 517,495

[52] U.S. Cl. ................................ 305/54; 305/58 R
[51] Int. Cl.² ...................................... B62D 55/24
[58] Field of Search ............... 305/54, 56, 58, 59; 180/2 R

[56] References Cited
UNITED STATES PATENTS

| | | |
|---|---|---|
| 1,258,608 | 3/1918 | Turnbull ........................... 305/54 |
| 1,421,270 | 6/1922 | McMullen ......................... 305/54 |
| 3,278,244 | 10/1966 | Deffenbaugh ..................... 305/54 |
| 3,362,492 | 1/1968 | Hansen ............................. 305/54 |
| 3,390,924 | 7/1968 | Bumbaugh ........................ 305/54 |

*Primary Examiner*—Philip Goodman
*Attorney, Agent, or Firm*—Phillips, Moore, Weissenberger Lempio & Strabala

[57] ABSTRACT

A track-type vehicle comprises a plurality of articulated track shoes each comprising a pair of downwardly converging sidewalls terminating at the grouser extending the full width thereof. The sidewalls define a V-shaped trough-like configuration and a track link is releasably attached thereto. A pair of parallel lugs are formed on the upper ends of the sidewalls.

23 Claims, 11 Drawing Figures

U.S. Patent  Feb. 10, 1976  Sheet 1 of 4  3,937,529
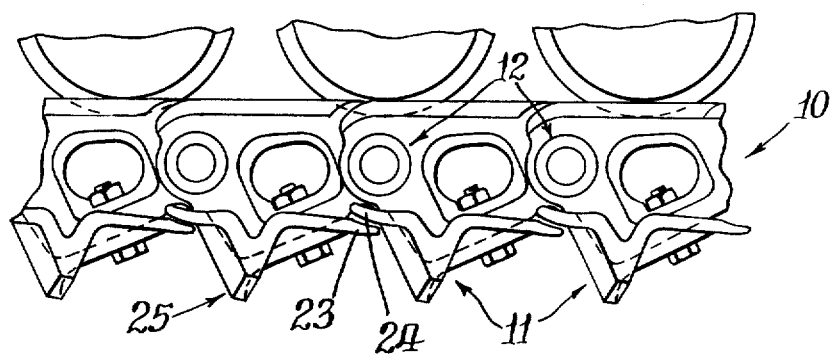
Fig_1_
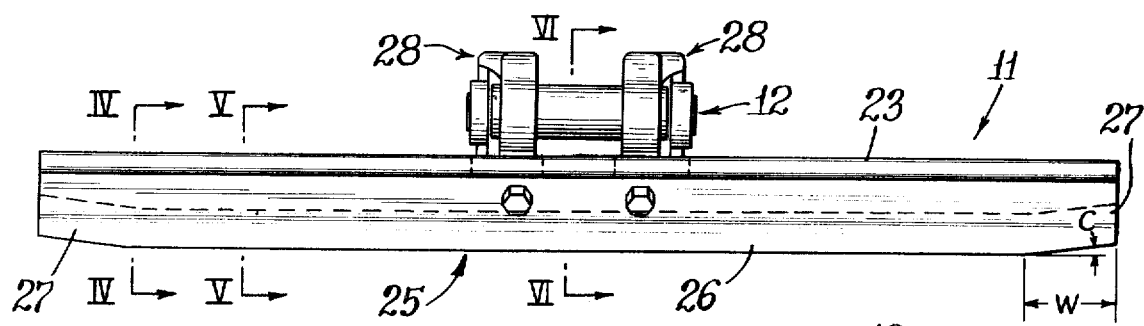
Fig_2_
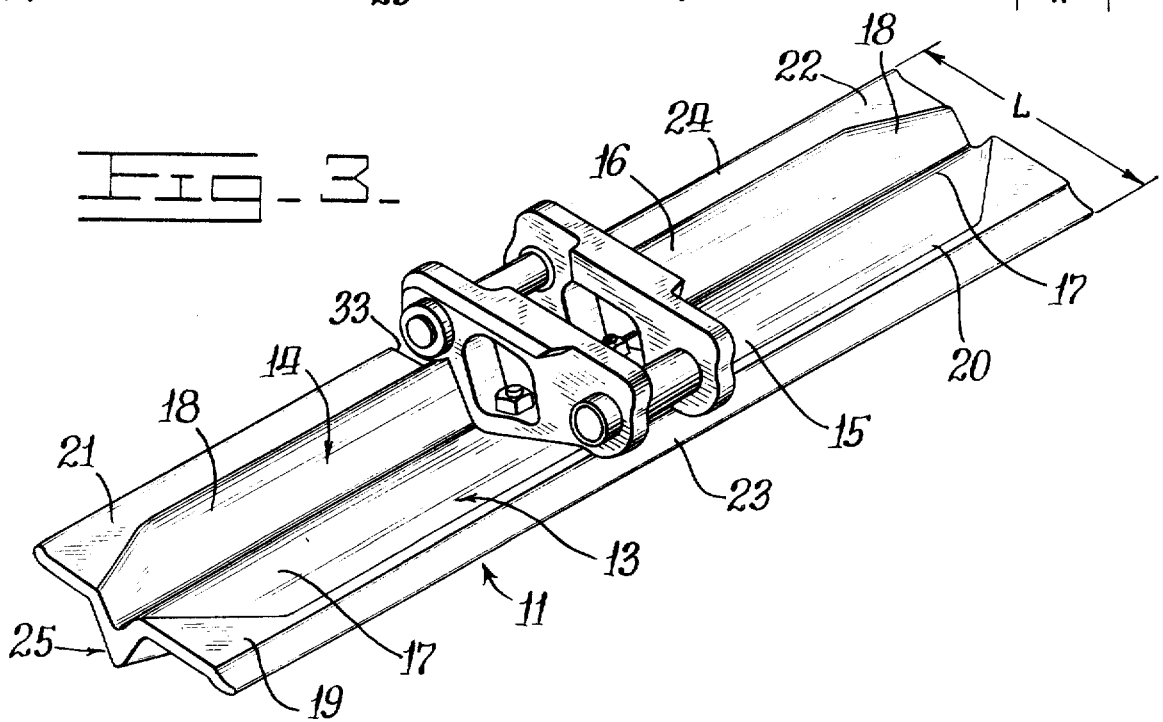
Fig_3_

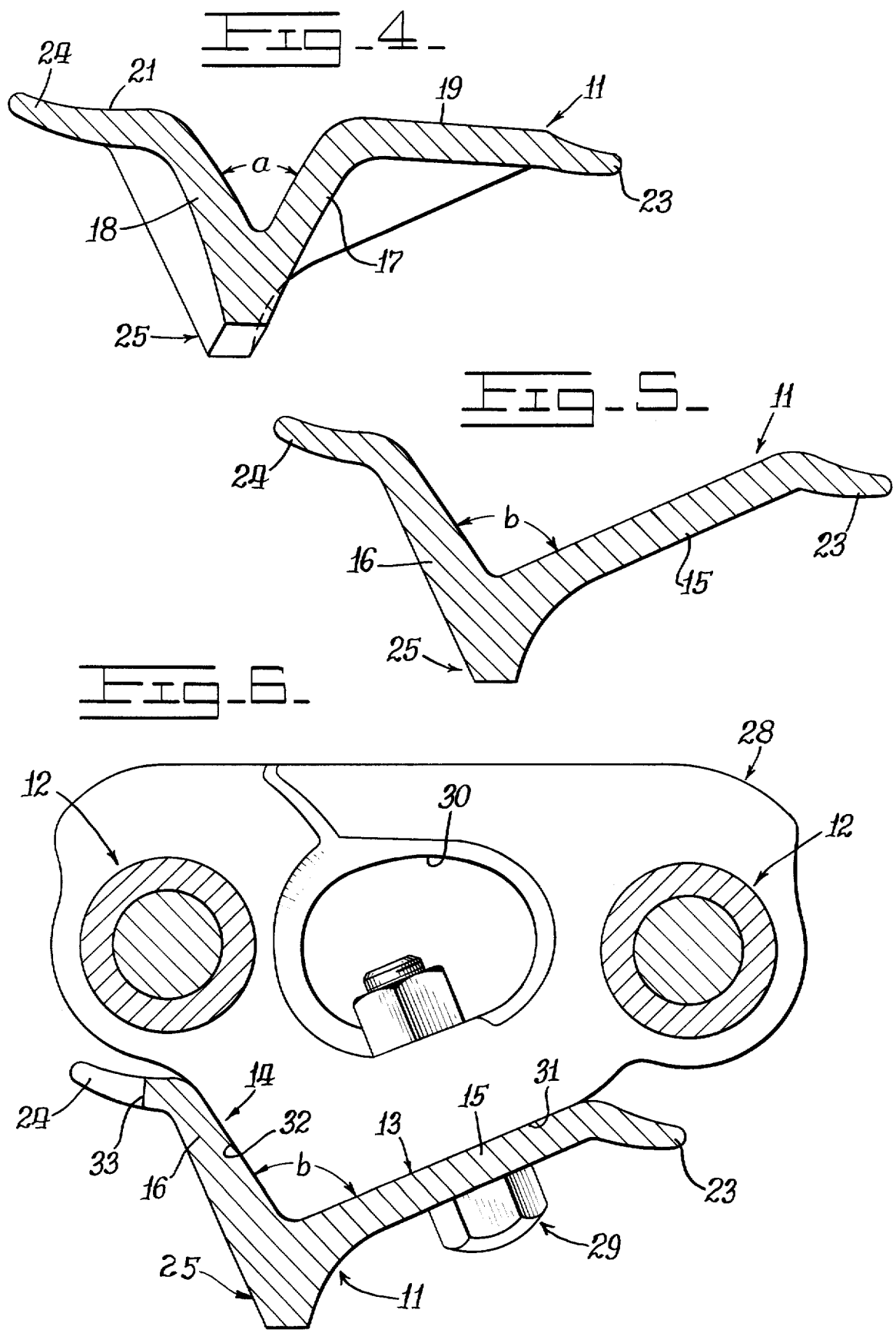

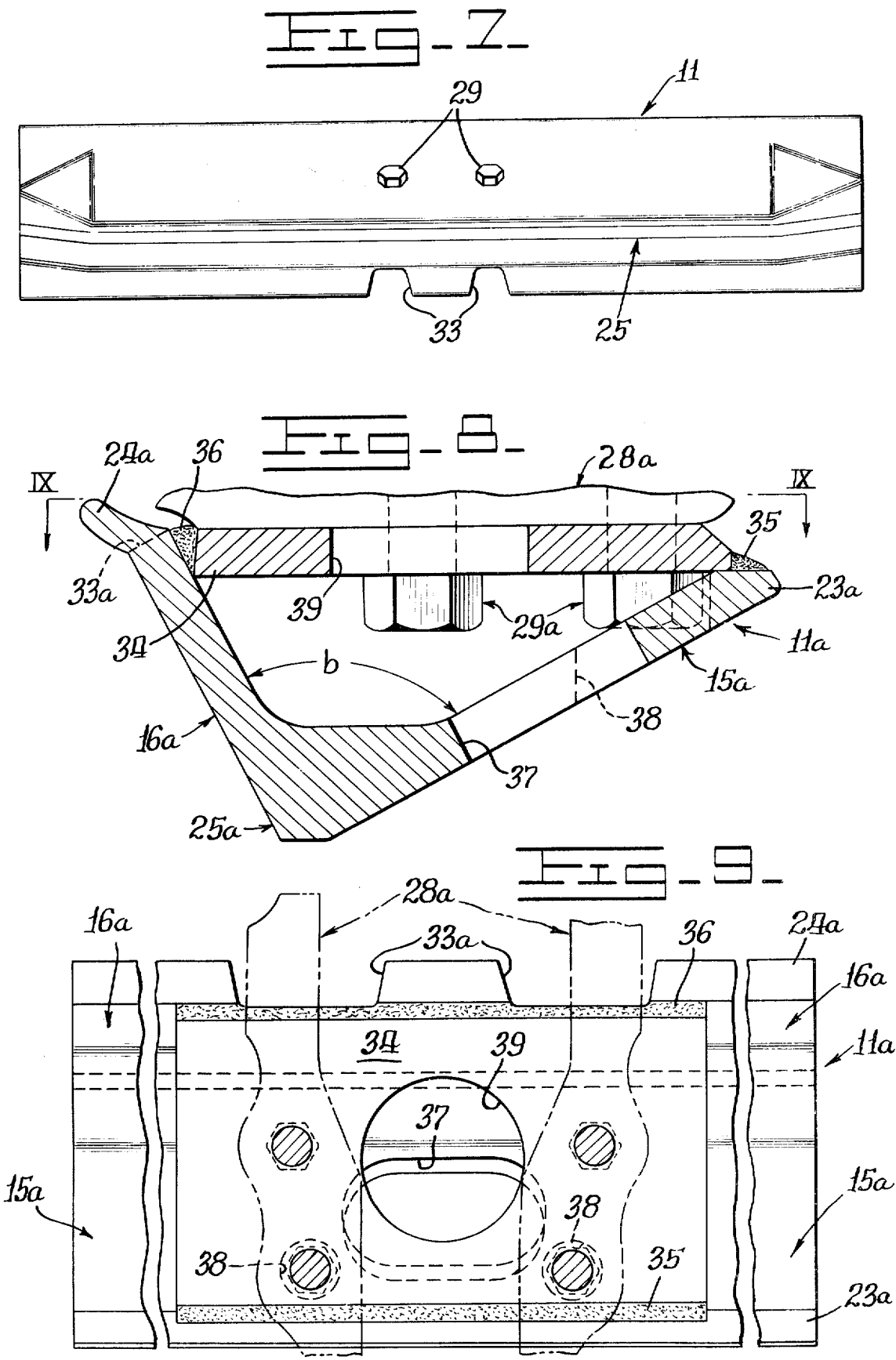

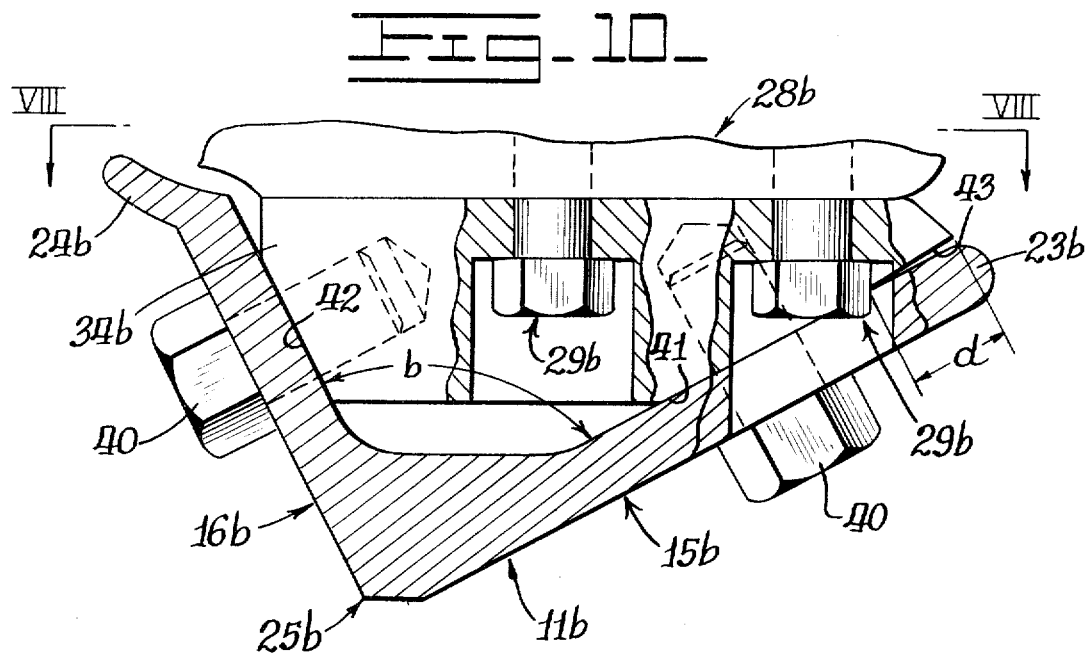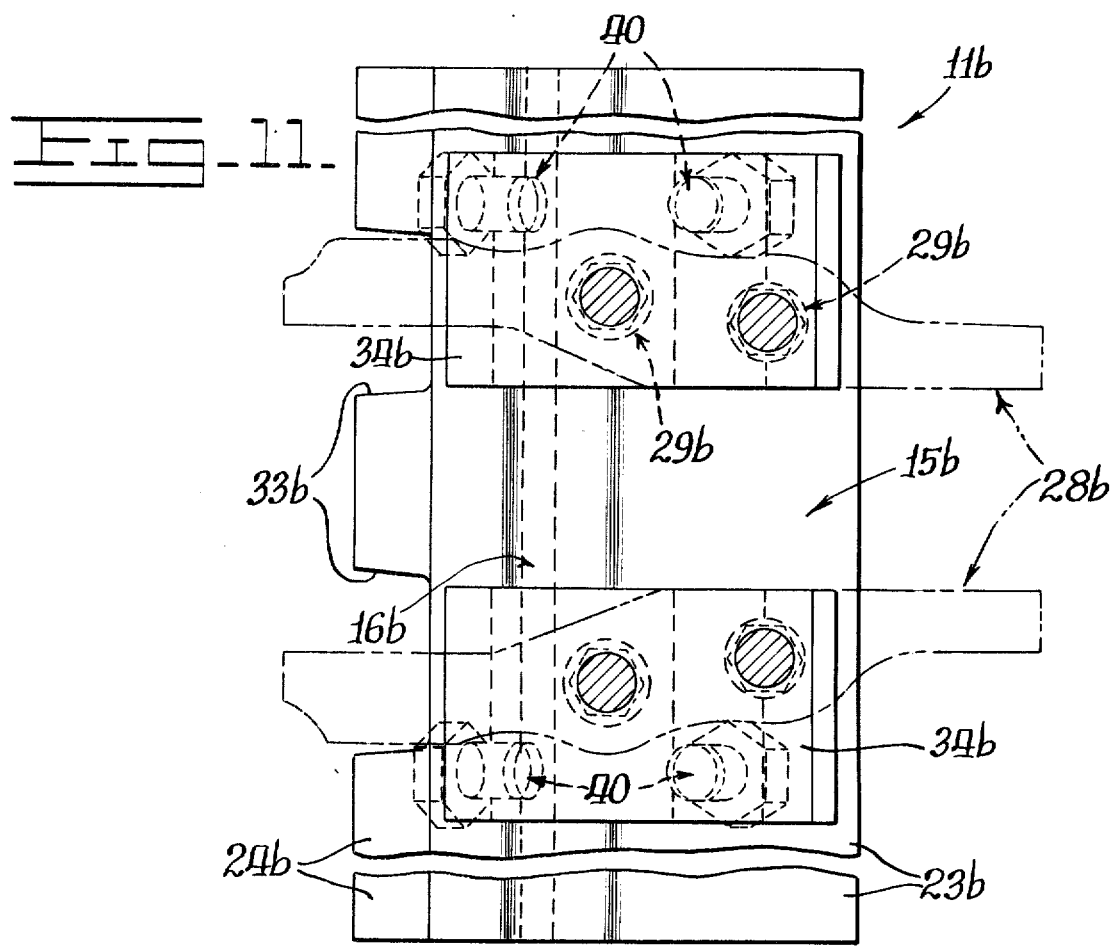

LOW GROUND PRESSURE TRACK SHOE

BACKGROUND OF THE INVENTION

Track-type tractors must often traverse "soft" soils, such as peat and volcanic ash, which gives rise to floatation and traction problems. Various modification to the track shoes have been proposed to improve the floatation and traction capabilities of the tractor by reducing the unit load on each track shoe. Such modifications usually constitute increasing the size and varying the shape of the track shoe. For example, U.S. Pat. No. 3,278,244, assigned to the assignee of this application, discloses such an improved track shoe. The prior art is further exemplified by U.S. Pat. Nos. 219,452; 1,139,009; 1,142,195; 1,192,423; and 1,265,388; as well as British Pat. No. 818,523.

Such prior art track shoes are normally expensive to manufacture and may tend to fail due to the high internal stresses and impact loads imposed thereon during operation ever harder underfootings, such as rock. In addition, the magnitude of the shear loads imposed on bolts, utilized to secure track links to the track shoes, are oftentimes sufficient to cause failure thereof. Also, the lateral ends of such track shoes are normally constructed to inhibit turning of the tractor and tend to churn the soil to inhibit the tractive effort thereof. Furthermore, the track shoes are normally constructed and arranged to entrap contaminants therein which tend to reduce the service life of the track shoes and their attendant structures.

SUMMARY OF THIS INVENTION

An object of this invention is to overcome the above, briefly described problems by providing an economical and self-cleaning shoe which exhibits a high degree of floatation and traction capabilities when traversing soft soils and further exhibits a high degree of structural integrity when traversing harder underfootings. The track shoe comprises a pair of sidewalls which extend downwardly in converging relationship to form an unobstructed trough-like configuration having V-shaped cross section throughout the entire width of the track shoe. The preferred track shoe embodiment of this invention, when viewed in top plan, has sidewalls which further extend laterally in converging relationship at each lateral end of the track shoe. Lower ends of the sidewalls terminate at a common grouser which extends the entire width of the track shoe and an upper end of each of the sidewalls has a generally horizontally disposed lug formed thereon which also extends the entire width of the track shoe. A link means is attached intermediate the lateral ends of the track shoe to pivotally interconnect a plurality of track shoes together to form an endless track assembly.

BRIEF DESCRIPTION OF THE DRAWINGS

Other objects of this invention will become apparent from the following description and accompanying drawings wherein:

FIG. 1 is a side elevational view of a portion of an endless track assembly employing a plurality of low ground pressure track shoes of this invention thereon;

FIG. 2 is a front elevational view of a track shoe having a pair of links attached thereon;

FIG. 3 is a perspective view of the FIG. 2 track shoe and links;

FIGS. 4–6 are enlarged sectional views taken in the direction of arrows IV—IV, V—V and VI—VI, respectively, in FIG. 2;

FIG. 7 is a bottom plan view of the FIG. 2 track shoe;

FIG. 8 is a cross sectional view similar to FIG. 6, but showing a modification of the FIGS. 1–7 track shoe;

FIG. 9 is a top plan view of the FIG. 8 track shoe and attached links, taken in the direction of arrows IX—IX in FIG. 8 and reorientated 90°; and FIGS. 10 and 11 are view similar to FIGS. 8 and 9, respectively, but showing a further modification of the FIGS. 1–7 track shoe.

DETAILED DESCRIPTION

FIG. 1 partially illustrates an endless track assembly 10 for a track-type tractor comprising a plurality of low ground pressure track shoes 11 pivotally interconnected in a conventional manner by pin and bushing assemblies 12. Referring to FIGS. 2–6, each track shoe comprises a pair of sidewalls 13 and 14 extending downwardly in converging relationship to form an unobstructed trough-like configuration having a V-shaped cross section throughout the entire width of the track shoe. The sidewalls respectively comprise major intermediate wall portions 15 and 16 and minor end wall portions 17 and 18.

The track shoe may be roll formed to comprise substantially uniform wall thicknesses and thereafter crimped at each end thereof as will be hereinafter more fully described. As shown in FIG. 3, the sidewalls further extend laterally in converging relationship at each lateral end of the track shoe, when viewed in top plan. Such construction is effected during the above-mentioned crimping operation which further defines triangularly shaped and substantially flat portions 19–22 formed at the corners of the rectangular track shoe.

During the preceding roll forming operation, a pair of lugs 23 and 24 are also formed on the upper ends of the sidewalls. Pursuant to the crimping operation, and each flat 19–22 is thus disposed between a respective sidewall and lug. As shown in FIG. 1, lugs 23 and 24 of adjacent track shoes function to continuously overlap each other during tractor operation.

Reffering to FIG. 4, wall portions 17 and 18 of sidewalls 13 and 14, respectively bridge flat portions 19 and 21 together and converge downwardly and laterally outwardly to define first included angles $a$ therebetween which diminish in magnitude towards an end of the track shoe. As shown in FIGS. 5 and 6, major wall portions 15 and 16 converge downwardly to define a substantially constant angle $b$ therebetween which is, preferably at least approximately 80°. In the embodiment shown, such angle is obtuse and closely approximate 100° and angle $a$ diminishes laterally outwardly from angle $b$ to approximately 60° in FIG. 4.

Sidewalls 15 and 16 terminate at a common grouser 25 formed at a lower apex end of the sidewalls to extend the entire width of the track shoe, as shown in FIGS. 2 and 7. The grouser is preferably disposed approximately under a respective pivot means 12 (FIG. 1) and comprises a straight mid-portion 26 which is at least substantially parallel relative to lugs 23 and 24. An end portion 27 of the grouser, at each lateral end of the track shoe, diverges upwardly towards the lugs at an acute angle $c$, preferably less than 10°, relative to mid-portion 26. In addition, the lateral width $W_1$ of grouser portion 27 is preferably selected from the range of from 25% to 50% of the length $L_1$ of the track shoe.

Referring to FIG. 6, link means constituting a pair of laterally spaced track links 28 straddle sidewalls 13 and 14 between lugs 23 and 24. Each link is directly attached to track shoe 11 intermediate its lateral ends by a releasable attachment or fastening means 29, preferably comprising a single bolt means, i.e., a nut and bolt. The link has an access opening 30 formed transversely therethrough to accommodate the nut as well and a pair of bearing surfaces 31 and 32 formed thereunder to engage wall portions 15 and 16, respectively, in close abutting relationship therewith. Such abutting surfaces absorb substantially all of the operating loads imposed on the track shoe during vehicle operation, i.e., shear loads imposed on fastening means 29 are substantially eliminated. It should be further noted that a pair of notches 33 are preferably formed on lug 24 to eliminate any possible interference thereat with the track links of an adjacent shoe.

FIGS. 8 and 9 and FIGS. 10 and 11 illustrate modifications of the above-described track shoe with attached links. Identical numerals appearing in FIGS. 8–11 depict corresponding constructions with numerals appearing in FIGS. 8 and 9 being accompanied by an *a* and those appearing in FIGS. 10 and 11 being accompanied by a *b*. As shown in FIGS. 8 and 10, an included angle *b* between the sidewalls of the respective track shoes is at least substantially constant, e.g., 80°, throughout the entire widths of such track shoes.

FIGS. 8 and 9 disclose a track shoe 11*a* having a pair of laterally spaced links 28*a* each attached to the track shoe by attachment means comprising a support member in the form of a separate flat plate 34 and a pair of bolts 29*a* each threadably attached to a nut (not shown). The flat plate is rectangular to have its sides straddle sidewalls 15*a* and 16*a* of the track shoe and secured thereto by a pair of laterally extending and parallel welds 35 and 36. An oblong aperture 37 and a pair of circular apertures 38 are formed through sidewall 15*a* to provide access to the heads of bolts 29*a*. A circular aperture 39 is formed through plate 34 to provide an enlarged opening between links 28*a* to provide egress of entrapped dirt and the like therethrough from the internal cavity of the track shoe when the links engage a drive sprocket (not shown).

FIGS. 10 and 11 illustrate a track shoe 11*b* having a pair of laterally spaced links 28*b* each releasably attached thereto by attachment means comprising pairs of bolts 29*b* and 40 and a support member in the form of a separate bearing block 34*b*. Bolts 40, releasably attaching the bearing block to the track shoe, have their heads exposed exteriorly of sidewalls 15*b* and 16*b*. Each bearing block has a pair of converging bearing surfaces 41 and 42 formed thereon to abut like-shaped inner surface portions of sidewalls 15*b* and 16*b* of the track shoe, respectively.

An outer side of bearing surface 41 is preferably relieved at 43, throughout a distance *d*, to reduce the amount of initial contact between the bearing surface and sidewall 15*b*. Such relief will insure a substantial bearing contact between the bearing block and the sidewall upon securance thereof by bolts 40. In particular, the sidewall might be slightly distorted during its roll forming and heat treatment operations and, therefore, relief *d* aids in assuring intimate contact thereat.

We claim:

1. An endless track assembly for a track-type vehicle comprising a plurality of pivotally interconnected ground engaging track shoes, each track shoe comprising a pair of downwardly converging sidewalls forming an open-ended, trough-like construction having a V-shaped cross section throughout the entire width thereof, end portions of said sidewalls extending laterally in converging relationships at each lateral end of said track shoe when viewed in top plan, a common grouser portion formed at lower apex ends of said sidewalls to extend the entire width of said track shoe, generally horizontally disposed first and second lugs each formed on an upper end of a respective one of said sidewalls to extend the entire width of said track shoe, the first lug of one track shoe overlapping the second lug of an adjacent track shoe in overlapping relationship therewith, link means disposed intermediate the lateral ends of each of said track shoes and straddling said sidewalls between said first and second lugs, pivot means pivotally connecting each end of each of said link means to an end of an adjacent link means, and attachment means attaching each of said link means to a respective one of said track shoes.

2. The track assembly of claim 1 wherein at least substantial portions of the sidewalls of each of said track shoes are disposed to define an included angle therebetween which at least approximates eighty degrees.

3. The track assembly of claim 1 wherein each of said track shoes further comprises a triangularly shaped and substantially flat portion disposed at each corner of said track shoe between a respective sidewall and lug.

4. The track assembly of claim 1 wherein first included angles between the end portions of said sidewalls are acute, adjacent lateral ends of said track shoe, and substantially less than a substantially constant second included angle between intermediate sidewall portions, disposed between said end portions.

5. The track assembly of claim 4 wherein said first included angles diminish laterally outwardly from said second included angle to at least approximately sixty degrees and wherein said second included angle at least approximates eighty degrees.

6. The track assembly of claim 4 wherein the grouser portion for each track shoe comprises a straight mid-portion formed at the lower ends of said intermediate sidewall portions and laterally disposed end portions formed at the lower ends of the end portions of said sidewalls to diverge upwardly towards said lugs at an acute angle relative to said mid-portion, when said track shoe is viewed in front elevation.

7. The track assembly of claim 6 wherein said acute angle is less than ten degrees.

8. The endless track assembly of claim 1 wherein an included angle between the sidewalls of each of said track shoes is at least substantially constant throughout the entire width of said track shoe.

9. The track assembly of claim 1 wherein each of said link means comprises a pair of converging bearing surfaces abutting respective sidewalls of a respective track shoe in substantial bearing contact therewith and wherein said attachment means constitute fastening means releasably and directly attaching said link means to said track shoe.

10. The track assembly of claim 9 wherein said link means constitute a pair of laterally spaced links each having said bearing surfaces formed thereon.

11. The track assembly of claim 10 wherein said fastening means constitutes a single bolt means releasably attaching each of said links to said track shoe.

12. The track assembly of claim 1 wherein each of said attachment means comprises a separate support member disposed to straddle sidewalls of a respective track shoe and fastening means releasably attaching said link means to said support member.

13. The track assembly of claim 12 wherein said support member constitutes a flat plate having each side thereof welded to a respective sidewall.

14. The track assembly of claim 13 further comprising means forming a substantially large opening through said plate to expose an internal cavity of said track shoe.

15. The track assembly of claim 12 wherein said support member constitutes a bearing block releasably attached to said track shoe, said bearing block comprising a pair of converging bearing surfaces abutting respective sidewalls of said track shoe in substantial bearing contact therewith.

16. The track assembly of claim 15 further comprising means normally forming a relief on a side of at least one of said bearing surfaces to normally slightly separate such bearing surface from such respective sidewall thereat.

17. The track assembly of claim 15 wherein said bearing block is releasably attached to said track shoe by at least one releasable bolt means projecting through each of the sidewalls thereof and threadably attached to said bearing block.

18. The track assembly of claim 12 further comprising means forming an access opening through a sidewall of each of said track shoes to expose said fastening means.

19. A ground engaging track shoe adapted for use in a track assembly of a track-type vehicle comprising
a pair of downwardly converging side walls forming an unobstructed trough-like construction having a V-shaped cross section throughout the entire width of said track shoe and further extending laterally in converging relationship at each lateral end of said track shoe when viewed in top plan,
a common grouser portion formed at lower apex ends of said sidewalls to extend the entire width of said track shoe,
a generally horizontally disposed lug formed on an upper end of each of said sidewalls to extend the entire width of said track shoe and
a triangularly shaped and substantially flat portion disposed at each corner of said track shoe between a respective sidewall and lug.

20. The track shoe of claim 20 wherein a straight mid-portion of said grouser portion is at least substantially parallel relative to said lugs and each laterally disposed end portion thereof diverges upwardly towards said lugs at an acute angle relative to the straight mid-portion of said grouser, when said track shoe is viewed in front elevation.

21. The track shoe of claim 20 wherein said acute angle is less than ten degrees.

22. The track shoe of claim 20 wherein each of said sidewalls has a substantially constant wall thickness throughout its entire width.

23. A ground engaging track shoe for use in a track assembly,
each track shoe comprising a pair of downwardly converging sidewalls having upper and lower ends forming an open-ended, trough-like construction of generally V-shaped cross section,
a grouser portion formed at an apex of the lower ends of said sidewalls comprising a straight mid-portion substantially parallel with the upper ends throughout the entire width of said shoe with the outer end portions of said grouser diverging upwardly at an acute angle relative to the midportion, and
a triangularly shaped and substantially flat portion disposed at each corner of said track shoe between a respective side and upper end.

* * * * *